United States Patent
Yusuf (10) Patent No.: US 9,562,198 B2
(45) Date of Patent: *Feb. 7, 2017

(54) DEMULSIFICATION AND EXTRACTION OF BIOCHEMICALS FROM CRUDE AND ITS FRACTIONS USING WATER AND SUBCRITICAL/SUPERCRITICAL CARBON DIOXIDE AS PROTON PUMP WITH PH TUNING WITHOUT PRECIPITATING OIL COMPONENTS

(71) Applicant: Saudi Arabian Oil Company, Dhahran (SA)

(72) Inventor: Zaki Yusuf, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 293 days.

This patent is subject to a terminal disclaimer.

(21) Appl. No.: 14/269,667

(22) Filed: May 5, 2014

(65) Prior Publication Data
US 2015/0315486 A1  Nov. 5, 2015

(51) Int. Cl.
*C10G 33/04* (2006.01)
*B01D 17/04* (2006.01)

(52) U.S. Cl.
CPC .............. *C10G 33/04* (2013.01); *B01D 17/044* (2013.01); *B01D 17/047* (2013.01)

(58) Field of Classification Search
CPC ... B01D 17/047; B01D 17/044; B01D 17/048; B01D 11/0403; C10G 2300/44; B01J 3/008
See application file for complete search history.

(56) References Cited

U.S. PATENT DOCUMENTS

| 4,098,692 A | 7/1978 | Baker et al. |
| 5,135,655 A * | 8/1992 | Cimino .............. B01D 11/0203 210/634 |
| 5,435,920 A | 7/1995 | Penth |
| 6,086,768 A | 7/2000 | Sims |

(Continued)

FOREIGN PATENT DOCUMENTS

| CN | 102 925 205 | 2/2013 |
| EP | 0 481 541 | 4/1992 |
| JP | H11 290610 | 10/1999 |

OTHER PUBLICATIONS

Nael N. Zaki et al., A Novel Process for Demulsification of Water-in-Crude Oil Emulsion by Dense Carbon Dioxide, Ind. Eng. Chem. Res. Nov. 4, 2003.

(Continued)

*Primary Examiner* — Michael A Salvitti
(74) *Attorney, Agent, or Firm* — Leason Ellis LLP (57) ABSTRACT

A demulsification process for extracting surface active biochemical products from crude oil and its fractions when they are used as feedstock during biochemical productions utilizes subcritical/supercritical $CO_2$ as a proton pump. The process also includes a pH tuning step, thereby inducing demulsification and precipitation of biochemical products into the aqueous phase, but avoiding asphaltene precipitation by apriori addition of resinous solvents derived from crude oil or bioresources. The biochemical products are then extracted from the aqueous phase via temperature change or some other technique.

19 Claims, 4 Drawing Sheets

(56) References Cited

U.S. PATENT DOCUMENTS

| | | | | |
|---|---|---|---|---|
| 6,413,430 | B1* | 7/2002 | Berger | B01D 17/0214 210/638 |
| 6,566,410 | B1 | 5/2003 | Zaki et al. | |
| 8,431,358 | B2 | 4/2013 | Sadowski et al. | |
| 8,961,780 | B1* | 2/2015 | Yusuf | C07C 7/10 208/325 |
| 9,169,446 | B2* | 10/2015 | Yusuf | C10G 33/08 |
| 2006/0201855 | A1* | 9/2006 | Pinho | B01D 17/06 208/263 |
| 2015/0184085 | A1* | 7/2015 | Yusuf | C10G 33/08 208/188 |
| 2015/0315486 | A1* | 11/2015 | Yusuf | B01D 17/044 516/141 |

OTHER PUBLICATIONS

S. Keles-oglu et al., "Flow properties of water-in-North Sea heavy crude oil emulsions", Journal of Petroleum Science and Engineering 100 (Dec. 2012) 14-23.

N. Aomari et al., "Rheology of water in crude oil emulsions Colloids Surfaces A:", Physicochem. Eng. Aspects 139 (1998) 13-20. Accepted Jun. 10, 1997.

S. Priyanto et al., "Measurement of property relationships of nano-structure micelles and coacervates of asphaltene in a pure solvent", Chemical Engineering Science 56 (Dec. 2001) 6933-6939.

Cesar Ovalles, Maria del Carmen Garcia, et al., "Structural interfacial activity relationships and thermal stability studies of Cerro Negro crude oil and its acid, basic and neutral fractions", Fuel vol. 77, No. 3, pp. 121-126, Jan. 1998.

I.H. Auflem et al., "Influence of pressure and solvency on the separation of water-in-crude-oil emulsions from the North Sea", Journal of Petroleum Science and Engineering 31 (Jul. 4, 2001) 1-12.

Mortada Daaou, Dalila Bendedouch, "Water pH and surfactant addition effects on the stability of an Algerian crude oil emulsion", Journal of Saudi Chemical Society (Jul. 2012) 16, 333-337.

Arla, D., Sinquin, A., Palermo, T., Hurtevent, C., Gracia, A., Dicharry, C., "Influence of pH and water content on the type and stability of acidic crude oil emulsions", Energy Fuel vol. 21, No. 3. 1337-1342, 2007. Accepted Oct. 27, 2006.

J. Plasencia et al., "Pipe flow of water-in-crude oil emulsions: Effective viscosity, inversion point and droplet size distribution", Journal of Petroleum Science and Engineering 101 (Jan. 2013) 35-43.

H. Parra-Barraza et al., "The zeta potential and surface properties of asphaltenes obtained with different crude oil/n-heptane proportions", Fuel 82 (May 2003) 869-874.

A. Rudrake et al., "A combined QCM and XPS investigation of asphaltene adsorption on metal surfaces", Journal of Colloid and Interface Science 332 (Apr. 1, 2009) 22-31.

M.A. Desando et al., "The low temperature oxidation of Athabasca oil sand asphaltene observed from 13C, 19F, and pulsed field gradient spin-echo proton N.M.R. spectra", Fuel 78 (Jan. 1999) 31-45.

K. Moran, J. Czarnecki, "Competitive adsorption of sodium naphthenates and naturally occurring species at water-in-crude oil emulsion droplet surfaces", Colloids and Surfaces A: Physicochem. Eng. Aspects 292 (Jan. 15, 2007) 87-98.

J. Sjöblom et al., "Our current understanding of water-in-crude oil emulsions. Recent characterization techniques and high pressure performance", Advances in Colloid and Interface Science 100-102 (Feb. 28, 2003) 399-473.

P.M. Spiecker et al., "Effects of petroleum resins on asphaltene aggregation and water-in-oil emulsion formation", Colloids and Surfaces A: Physicochem. Eng. Aspects vol. 220 (Jun. 30, 2003) pp. 9-27.

W.L. Kang et al., "Stability mechanism of W/O crude oil emulsion stabilized by polymer and surfactant", Colloids and Surfaces A: Physicochem. Eng. Aspects vol. 384 (Jul. 5, 2011) 555-560.

Le Follotec et al., "Triblock copolymers as destabilizers of water-in-crude oil emulsions", Colloids and Surfaces A: Physicochem. Eng. Aspects vol. 365 (Aug. 5, 2010) 162-170.

M. Li et al., "Colloids and Surfaces A: Physicochem. Eng. Aspects: The effect of molecular parameters on the stability of water-in-crude oil emulsions studied by IR and UV spectroscopy". vol. 197 (Feb. 4, 2002) 193-201 S.

Das et al., "Analytical model for zeta potential of asphaltene", Fuel vol. 108 (Jun. 2013) 543-549.

S.-Y. Yang et al., "Statistical analysis on parameters that affect wetting for the crude oil/brine/mica system", Journal of Petroleum Science and Engineering vol. 33 (Apr. 2002) 203-215.

K.L. Gawrys, P.K. Kilpatrick, "Asphaltenic aggregates are polydisperse oblate cylinders", Journal of Colloid and Interface Science vol. 288 (2005) 325-334.

Mojzisova et al., "The pH-dependent distribution of the photosensitizer chlorin e6 among plasma proteins and membranes: A physico-chemical approach", Biochimica et Biophysica Acta 1768 (Feb. 2007) 366-374.

A.D. Ward et al., "An investigation into the stability of aqueous films separating hydrocarbon drops from quartz surfaces", Journal of Petroleum Science and Engineering 24 (Dec. 1999) 213-220.

Karen L. Toews, Robert M. Shroll, Chien M. Wai, Neil G. Smart, "pH-Defining Equilibrium between Water and Supercritical CO2 Influence on SFE of Organics and Metal Chelates", Anal. Chem., Oct. 1995, 67 (22), pp. 4040-4043.

J. D. McLean and P. K. Kilpatrick, "Effects of Asphaltene Solvency on Stability of Water-in-Crude-Oil Emulsions", Journal of Colloid and Interface Science 189, 242-253, May 15, 1997.

"Forum for Science, Industry and Business." Emulsion Buster. N.p., Apr. 9, 2010. Web.

* cited by examiner

DEMULSIFICATION AND EXTRACTION OF BIOCHEMICALS FROM CRUDE AND ITS FRACTIONS USING WATER AND SUBCRITICAL/SUPERCRITICAL CARBON DIOXIDE AS PROTON PUMP WITH PH TUNING WITHOUT PRECIPITATING OIL COMPONENTS

TECHNICAL FIELD

The present invention relates to a process for the demulsification of crude oil. More specifically, the present invention relates to a demulsification process for the extraction of biochemicals from crude oil and its fractions, while avoiding precipitation of undesired crude oil components.

BACKGROUND

Crude oil and its fractions are used as feedstock for producing valuable chemicals. In the future, various high-value added biochemicals can also be commercially produced from the bioprocessing of crude oil and its fractions in the presence of water. Crude oil in oil fields often times forms an emulsion with water.

An emulsion is a mixture of two or more liquids that are normally immiscible where one phase is discontinuously dispersed in other continuous phase. There are several types of oil/water emulsions including, water-in-oil (w/o) emulsions [water is the dispersed phase, oil is the continuous phase] and oil-in-water (o/w) emulsions [oil is the dispersed phase, water is the continuous phase], as well as more complex emulsions such as water-in-oil-in-water (w/o/w) emulsions and oil-in-water-in-oil (o/w/o) emulsions. More often than not, the emulsions produced in oil fields are w/o emulsions.

In these emulsions, there are a number of surface active molecules that contribute to its viscosity. Further, resistant films at the crude oil/water interface usually form due to the presence many types of interfacial active components (groups, COOH etc.) from the oil phase possessing electrically charges interacting with the ions present in water ($H^+$, $OH^-$, $Cl^-$, etc.). The emulsions in crude oil and its fractions can be formed from the indigenous components.

The high-value biochemicals present or formed or produced in crude oil have diverse applications, including cancer drug application, drilling fluid, cosmetic surgery, and heavy metals removal from drinking water. However, since these indigenous biochemicals are produced in substrates, such as crude oil and its fractions, are highly surface active compounds, they usually create tenacious emulsions in an oil-water system that is very difficult to break (i.e., demulsify). Thus, it is difficult to extract the biochemical from the mixture. In many of these cases, the conventional extraction (demulsification) methods are ineffective due to the high viscosity of the system and strong amphiphilic properties of the surfactants.

Further, while there are some methods for the demulsification of crude oil, these methods typically result in the precipitation of asphaltenes—a type of surface active macromolecules in the oil—which can result in equipment malfunction. Specifically, the precipitation of asphaltenes can cause deposition of asphaltenes in pipelines, and pumps, which can lead to reduced, plugged pipelines, and damaged pumps. Accordingly, it is desirable to avoid asphaltene precipitation.

Thus, there is a need for demulsification methods that are both effective at extracting high-value biochemicals, yet also avoid the precipitation of asphaltenes.

SUMMARY

The present invention is directed to a method for extracting surface active biochemical products (e.g., rhamnolipids) of crude oil and its fractions when they result from biochemical reactions in crude and its fractions. More specifically, the present invention relates to a demulsification process that utilizes subcritical/supercritical $CO_2$ as a proton pump with pH tuning, but also avoids asphaltene precipitation.

In the present invention, subcritical to supercritical $CO_2$ is introduced into a crude oil emulsion (e.g., oil-in-water, water-in-oil, water-in-oil-in-water, or oil-in-water-in-oil emulsions) such that it diffuses into the oil-water phase boundary and eventually into and across the aqueous phase with ease, thereby inducing a large pH drop depending on the temperature and pressure of the system. The injected $CO_2$ then forms carbonic acid in the aqueous phase by interacting with the water molecules across the water phase including the emulsion film boundary. The lowering of the pH at the interface of the emulsion of the system results in change in the balance of charge distribution between the surface active molecules (e.g., asphaltene, resin acids, naphthenic acids, and rhamnolipids) and water at the emulsion interface resulting in the deactivation of the surface activity of the molecules. This deactivation results in the weakening of the interfacial skin of the emulsions as the surface active components loses its affinity for the water molecules.

The crude oil is then mildly agitated or mixed, which leads to a coalescence of the emulsions. Once the emulsions have coalesced, their size reaches a critical point in which gravity separates the oil and water (aqueous) fractions. In such scenarios, rhamnolipids molecules migrate to the aqueous phase, while maintaining the presence of pressurized $CO_2$ in the aqueous system which acts as a proton pump. Once the oil and aqueous phases are separated via coalescence, rhamnolipids can be collected from the aqueous phase via temperature changes or evaporation of the water. Asphaltene precipitation is avoided in this process by maintaining the aromatic resin-to-asphaltene ratio in the mixture at a level higher than the critical level, which can be accomplished via the introduction of oil resin supplements (deployed as solvating agents for the asphaltene macromolecules) into the crude oil emulsion prior to or during the demulsification process.

BRIEF DESCRIPTION OF THE DRAWING FIGURES

A more complete understanding of the invention and its many features will be attained by reference to the following detailed description and the accompanying drawings. It is important to note that the drawings illustrates only a few embodiments of the present invention and therefore should not be considered to limit its scope.

DETAILED DESCRIPTION OF CERTAIN EMBODIMENTS

The present invention is directed to a method for extracting surface active biochemical products (e.g., rhamnolipids) from crude oil emulsions after they are produced from the biochemical productions.

A. An Emulsion

The co-existence of water and crude oil in the form of an emulsion is highly unattractive from both a process and product quality perspective. Some components of oil play the role as natural and indigenous surfactants, while resistant films at the crude oil/water interface also typically form due to the presence of many types of interfacial active components of the molecules and macromolecules present in the oil phase. Asphaltenes and resins (aromatic resins) both play a surfactant role at the w/o or o/w interface because of their partial affinity (amphiphilic properties) to both water and oil.

As observed from interfacial tension (of the film/skin/lamella) versus pH studies of the crude oil and its extracts, it is known that interfacial activity at the interface originates from the presence of primarily carboxylic acid (—COOH) species in asphaltenes, resins and naphthenic acid.

The resins are the lighter macromolecules compared to asphaltenes, and they behave as solvating agents similar to regular aromatic compounds with surface active groups attached to it. The dynamics of their interaction with the water to create w/o interface is based on the presence of the other polar components present in these macromolecules. Usually, as compared with higher molecular weight resins, lower molecular weight resins have a tendency to be the more interfacially active (i.e. also faster to reach and cover a fresh w/o interface), as they exhibit stronger acid strength compared to their longer chain homologues.

The interfacial activity of carboxylic acids (RCOOH) is pH-dependent as they are weak acids and their dissociation is dependent upon local pH. In general, the lightest organic polar molecules are comparatively more easier to dissolve in water at neutral pH with minimal contribution to emulsion formation, whereas the heaviest molecules are predominantly oil-soluble and their hydrophobic part remains dissolved in the organic phase with their polar components interacting with the water molecules at the w/o interface between right pH range. After the completion of the production of rhamnolipid molecules, it also participates in the emulsion formation at the interface between oil and water along with asphaltenes and resin macromolecules. The extraction of rhamnolipids from such an emulsion requires the deactivation of the surface active properties of these molecules, which interact as a bridge between the oil and the aqueous phase.

The origin of water may result from the supplementary reaction media along with the crude oil or its fraction counterpart to receive nutrients and discharge metabolites. Also, in many cases, the mixing or agitation of water and crude oil mixture may form stable water-in-oil emulsion where water may remain in dispersed phase (o/w). It is well known that the stability of water in crude oil emulsion depends mainly on a rigid protective film encapsulating the water droplets at the phase boundary. As mentioned earlier, the asphaltenes and resins (as natural surface active agents) are present at this interfacial film from the crude oil. Resins increase the dispersion of asphaltenes in the crude and hence minimize the asphaltene aggregation/flocculation amongst themselves. Further, as the resins—asphaltenes ratio decreases, the emulsions become tighter and harder to break as the presence of increased number of asphaltene macromolecules on the interfacial skin of the emulsion gives the emulsion increased rigidity.

It should be understood that the lower molecular weight resins allow more flexibility to the interfacial relaxation at the interface, whereas the the higher molecular weight asphaltenes results in the formation of tighter emulsion which are difficult to break. The presence of native organic acids may also contribute to enhanced emulsion stability. These organic acids present in crude oil in many cases are primarily of naphthenic acid type, RCOOH, which result from crude oil biodegradation. The heavier compounds such as asphaltenes and resins also could have COOH and other polar groups attached to their structure. All of these compounds with amphiphiles attached to their macromolecular structure may contribute to the formation and stability of emulsions and emulsions containing including rhamnolipids. Naphthenic acids also impart favorable conditions for the stability of emulsions at their interface. The deactivation of these acidic groups at the oil water interface from the crude oils has a large effect on the emulsion stability.

When these surface active agents accumulate at the water-oil interface, they prevent the droplets from coalescing to form larger droplets, which would prevent them to phase separate. Among these components, asphaltenes are believed to be the major ones stabilizing the emulsion due to the presence of attached COOH groups. In most cases, resins or naphthenic acid cannot independently produce stable emulsions. Moreover, resins and naphthenic acid may in some cases overlap/entwine with asphaltene molecules at the interface and affect emulsion stability. In particular, resins solubilize asphaltenes in oil in such a way as to preclude asphaltenes from associating with each other while forming the interfacial film and, thereby lowering the emulsion rigidity. The asphaltenes represent the heaviest and most polar fraction of the crude oil and their representative macromolecules contains mainly a sheet of condensed aromatic rings with aliphatic side chains and various functional groups. With these structural characteristics, asphaltenes exhibit surface activity and act as indigenous emulsifiers.

The lowest molecular weight of asphaltene molecules may be in the range of 500 Da, which is similar to the typical molecular weight of other naturally present surface active agents (for example, resins and naphthenic acids molecules typically have a molecular weight of 300-400 Da). These low molecular weight natural surfactants move relatively at a faster pace to reach the film surface and reach equilibrium, while the asphaltenic material (which moves slowly towards the interfacial film) forms more of an inelastic surface coverage. When the larger asphaltene molecules accumulate at the droplet film surface, it provides rigidity to the o/w and w/o interface.

Therefore, indigenous components in the crude oil contribute to increased or decreased levels of emulsion stability or tenacity. Additionally, fine solids (both organic and inorganic) contribute to the stabilization of the emulsion. The chemistry of asphaltenes is dependent on many factors, viz., temperature, pressure and its indigenous organic dispersants (e.g., resins, naphthenic acids).

It should be noted that the asphaltenes do not act as segregated entity, but instead remain in an aggregated state. Additionally, the interfacial film is never a monomolecular layer, but rather the physical make-up is created by accumulated asphaltene aggregates, resins, naphthenic acid etc. at the surface of the water droplets. The asphaltene molecules tend to form a floc due to π-π interactions at the w/o interface in crude oil, thereby synergizing the stability of w/o emulsion, unless the higher aromatic resin-to-asphaltene ratio of oil is falls below a threshold limit. The asphaltenes, resins, waxes, and small solid particles together are generally considered to be responsible for the emulsion stability by forming highly viscous or rigid films at the oil-water interface. These molecules form a kind of skin (or lamella) around water droplets and strongly reduce the coalescence of the emulsion droplets.

With different conditions (e.g., pH and water content), an acidic crude oil may form different type of emulsions with different stability. However, with the presence of fatty acids (naphthenic acids) in the crude oil, the emulsion pattern generally changes with interaction with the water phase in addition to the presence of asphaltene and resins. One of the most fundamental properties in systems of fatty acid-salty water is the formation of a lamellar lyotropic liquid crystalline D-phase. This phase has a microstructure involving bilayers of surface active molecules and macromolecules over the prevailing water layers at the emulsion boundary. It has been unambiguously shown that such structures will enhance the stability of w/o emulsions. The final protection against coalescence originates from the existence of a multilayer giving the interfacial regime a higher interfacial strength and rigidity.

As mentioned earlier, crude oils generally contain large amounts of naphthenic acids, RCOOH, which result from crude oil biodegradation. It has been found that the type of emulsion is governed by the acidic amphiphiles contained in the intermediate fraction. The stability of oil-in-water emulsions is governed by electrostatic repulsion between the naphthenates, $RCOO^-$, existing at the interface, while the stability of water-in-oil emulsions is governed by the amphiphiles present in the heavy fraction (i.e., asphaltenes and resins).

Naphthenic acids are hydrocarbons with a molecular structure of RCOOH, where R is generally characterizes as a cyclopentane and cyclohexane derivative. The exploitation of acidic oils opens up constraints during the oil production operation. The reservoir waters are naturally saturated with carbon dioxide ($CO_2$) in equilibrium with bicarbonate anions ($HCO_3^-$). During the oil production process, the pH gets elevated due to the drop in pressure and with the release of $CO_2$, $RCOO^-$ naphthenates salts are formed when cations are present in the reservoir water. Like resins (and resin acids) and asphaltenes, naphthenic acids and their salts may also behave as surface-active compounds. They may also contribute to the formation of emulsions and become a major contributor to water/crude oil separation difficulties.

The chemical behavior of naphthenic acids is similar to representative carboxylic acids with acid strengths similar to those of the higher fatty acids. The acid dissociation constants are in the order of $10^{-5}$ to $10^{-6}$ ($pK_a$~5-6). Naphthenic acids are slightly weaker than low molecular weight carboxylic acids, such as acetic acid. Therefore, it is well recognized that such emulsions are stabilized by means of an interaction between different heavy components (e.g., asphaltenes, resins), organic particles, the pH of the water phase and the inorganics present in the crude oil, respectively. In a depressurized anhydrous crude oil, the asphaltenes normally found as dispersions stabilized by the aromatics and resins or in exceptional few cases in particulate form. The role of the resins and lighter polar components is to stabilize the asphaltene dispersion/suspension by by π-π interactions. Due to this π-π interactions from resins, the asphaltene macromolecules can avoid simultaneous coagulation and precipitation.

When water gets introduced to the crude oil, the condition significantly changes. The system reaches an energetically higher level, and since the energy difference is proportional to the interfacial area created during the mixing process, the newly created interfacial area begin to pull the surface active components of oil components from the oil phase. Thus, the molecules with highest surface activity tend to move towards the fresh w/o interface to diminish the level of energy at the interface. In such cases, the lower molecular weight surface active molecules (e.g., the resins, naphthenic acids) move quicker to the oil water interface. In essence, a competition take place between resin (or naphthenic) molecules and the solvated asphaltene macromolecules at the w/o or o/w interface.

The factors that determine the final position of the resins are the hydrophilic/lipophilic balance (HLB) or in some cases the hydrophilic/lipophilic difference HLD) of these molecules and the corresponding properties of the solid surface. The higher surface active components (with attached polar groups) tend to show affinity for the w/o interface over both less hydrophillic resin molecules and also, to some extent, the asphaltenes. Since the asphaltene molecules are larger in size, they tend to move slowly towards the interface. Thus, the solubility conditions of the asphaltenes may partially change and a minor particulate precipitation may take place at the interface. With aqueous droplets coated by an interfacial resin film as its closest neighbors, the asphaltene particles tend to overlap and accumulate on the droplet surface film. As a result, the resulting interfacial properties have higher tenacity and the stability of the corresponding emulsions considerably increase.

The mechanical properties of the protecting interfacial film provides the strength and stability level of the w/o emulsions. The overlapping of concentrated polymeric type organic molecules at the interfacial films may provide either elastic or viscous properties that make the demulsification process challenging and time consuming. The aromatic asphaltene molecules form into sandwich-like stack structures as a result of the molecular association.

The presence of carbonyl groups in the interfacially active components is a critical requirement for the emulsion stability. However, the relative instability of the emulsion formed with resins (—COOH groups) in a model system (artificial system) compared to its corresponding asphaltene fraction shows that the presence of —COOH groups may not be adequate, and may require a longer organic chain (e.g., asphaletenes).

Moreover, the OH and carbonyl groups (—C=O) in resins or asphaltene molecules play the role of forming a mechanical barrier through hydrogen bonding around the water droplets thereby preventing coalescence. The open chain carbonyl groups (—COOH) in resin or asphaltenes are more likely to play a critical role to provide better stability of the emulsion as they are more amenable for hydrogen bonding compared to rigid carbonyl (—C=O) groups in the ring structures of asphaltenes and resins.

Zeta potential (ζ) is an important characteristic of the emulsion (instability) that relates to the isoelectric point (IEP) of the material at ζ=0. At pH values smaller than the IEP, the zeta potential is positive, whereas at pH values higher than the IEP, the zeta potential is negative. The pH effect on the zeta potential of asphaltenes can be explained by looking at the surfaces of these materials containing pH-dependent functional groups—acidic and/or basic—of which either or both undergo dissociation and protonation. A negative surface charge on asphaltenes arises from the dissociation of acidic surface functional groups such as carboxylic acid (—COOH), which exhibit $pK_a$ values of about 4 at ambient conditions. The positive surface charge arises upon protonation of basic, nitrogen-containing functional groups such as pyridine. The pH value for the isoelectric point ($pH_{IEP}$) of asphaltene 1:5 is about 4.5, and for asphaltene 1:15 and asphaltene 1:40, the $pH_{IEP}$ is 3.0 in heptane solvent.

The acid/base type interaction between oil/brine and brine/mineral interfaces also may contribute to the emulsion film stability. Polar functional groups from both oil and mineral can act as acids or bases when they are in contact at the oil/brine and brine/mineral interfaces. Depending on the pH and salinity of the water phase, the interaction between the two charged interfaces determines the double layer force. The distribution of charges, electric potential, and sign of the charged sites on both interfaces determine whether the interaction is attractive or repulsive. The attractive forces tend to cause the emulsion film to become unstable and possibly rupture as the charges shift their attention from the water molecules in/at the aqueous phase to the polar groups in the oil phase. This will provide direct contact between the charges of the asphaltenes to the oppositely charged surface-active polar functional groups of oil at the oil/water interface and the oppositely charged polar groups in bulk phase of the oil. Conversely, when the double layer force is repulsive (i.e., the solids and functional groups of oil have similar charges) the water film will remain stable as long as the repulsive double layer force is larger than the attractive van der Waals force and the applied capillary pressure. The presence of multivalent cations can cause unstable water films through opposing polar attraction.

Therefore, it is important to understand the petroleum chemistry—including its interaction with acid/base, surfactants, the electrokinetic behavior, hydrophilic and lipophilic balance (HLB), hydrophilic and lipophilic difference (HLD), isoelectric behavior (zeta potential), and ionic strength—at the interface of the emulsions to effectively and quickly demulsify the w/o or o/w emulsions and force the molecules with higher hydrophilic property to move into the aqueous phase.

In the current invention, the pressurized/dissolved $CO_2$ has effect on deactivating the —COOH group of the rhaminose. However, the rhaminose sugar(s) present in rhamnolipid would tend to dissolve in the water phase or precipitate in the water phase. Therefore, due to the presence of sugar groups in the rhamnolipids and its larger size, the molecules end up in the aqueous phase as a precipitate or dissolved molecule depending on the temperature of the system.

B. Petroleum Chemistry

Crude oil is typically considered to be a colloidal dispersion of asphaltene and resins, which constitute the discrete and polar components, dispersed in a continuous phase made of non-polar compounds. Resins in crude oil act as peptizing agents (bridging agents) keeping asphaltenes in suspension and maintaining the stability of crude oil. When resins are separated from crude oil, the stability of this colloidal system is lost and asphaltene deposition takes place. Crude oil is a heterogeneous, complex organic mixture comprised predominantly of saturated and aromatic hydrocarbons. It also contains heteronuclear compounds, emulsified water, and other inorganics. The hydrocarbon portion mostly contains normal alkanes, isoalkanes, cycloalkanes, aromatics (mono-, di-, and polynuclear aromatic hydrocarbons [PAHs] with alkyl side chains), resins (aggregates with a multitude of building blocks such as sulfoxides, amides, thiophenes, pyridines, quinolines and carbazoles), and asphaltenes (aggregates of extended polyaromatics, naphthenic acids, sulfides, polyhydric phenols and fatty acids) with thousands of assorted derivatives.

The asphaltenes are colloidal in nature and have an atomic hydrogen-to-carbon ratio in ranges between 1.0 and 1.2. The N, S, and O content of asphaltene is small, implying that a large segment of the asphaltene backbone is constituted of fused aromatic carbons interspersed with polar functional groups containing five to seven heteroatoms per macromolecule. Additionally, the distribution of these diverse classes of heteronuclear, polycyclic compounds, comprised of N, S, O or metallic compounds, vary according to their molecular weight, structure, and volatility, and are generally concentrated in higher boiling ranges. Moreover, petroleum properties show wide ranging properties and heterogeneity with respect to the petroleum's origin and location. Likewise, petroleum processed in a refinery is typically a mixture of crude oils of different origin, and therefore possesses intermediate characteristic properties determined by the crude origins present in the individual feedstock of the mix.

The stability of crude oil dispersions is closely related to the electrical characteristics of the interface between the discrete and continuous phases. The average molecular weight of asphaltene is debatable and may range from about 700 to about 15000 amu. The electrical surface charge of asphaltenes may differ with respect to the origin of asphaltenes. For example, some have measured a net positive charge in water and ethanol, while others have measured a net negative surface charge. The asphaltene fraction contains the largest percentage of heteroatoms (O, S, N) and organometallic constituents (Ni, V, Fe) in the crude oil. Amine groups, carboxylic groups, S, N, O, and metals are present in both asphaltene and resin components of oil. The structure of asphaltene molecules is believed to consist of polycyclic aromatic clusters, substituted with varying alkyl side chains.

This solubility class definition of asphaltenes suggests a broad distribution of asphaltene molecular structures that vary greatly among crude sources. In general, asphaltenes possess fused ring aromaticity, small aliphatic side chains, and polar heteroatom-containing functional groups (e.g., carboxylic acids, carbonyl, phenol, pyrroles, and pyridines) capable of donating or accepting protons inter- and intra-molecularly.

The most plausible mechanisms of asphaltene aggregation involve primarily π-π interactions between aromatic rings, hydrogen bonding between polar functional groups, and other charge transfer interactions. Therefore, asphaltene aggregation behavior is likely controlled by the polydispersity, chemical composition, and steric arrangement or interconnectivity of functional groups in the asphaltene monomers.

1. Organometallic Chemistry

The metals in crude oil occur in diverse organic and inorganic forms. The inorganic forms of metals and organometallic compounds are distributed roughly in relation to their volatility. The organic metals in crude oil are usually present in two forms. Zn, Ti, Ca, and Mg are usually present in combination with naphthenic acid as soaps. Conversely, V, Cu, Ni, and part of the Fe are present as oil soluble porphyrin-type compounds.

The primary metallorganic compounds found in crude oil are known as metalloporphyrins. Porphyrins have ring structure similar to chlorophyll and have rings with metals present at the center of the ring as chelated compounds. Vanadium (V), iron (Fe II) and nickel (Ni II), collectively known as heavy metals, are largely present at the center of the porphyrin rings. The more volatile species (mainly mercuric hydrocarbon) are found in the more volatile saturated fractions, whereas the vanadyl (V) and Ni porphyrins are found in intermediate polarity molecular mass fractions in addition to N, S, and O-containing cyclic and polycyclic compounds. The heavy metals (Me) in crude oil residue are agglomerated in asphaltenes in the form of porphyrin compounds. The molecular weight of this type of compound varies between 420 and 520 (i.e., from $C_{27}N_4$ to $C_{33}N_4$).

A large fraction of V (10-60 percent) is found as heteroatoms, forming porphyrinic structures in crude oil. The metallic entities are also found in low volatility species in the resin and asphaltene fractions. However, their presence is mostly observed in the non-volatile asphaltene aggregates. The evidence provided here clearly indicates that the asphaltene molecules are the most complex component of crude oil and has large impact on demulsification and oil refining. The asphaltene fraction is defined mutually inclusively, on the basis of their solubility in toluene and immiscibility in n-heptane solvents.

The metal components, which are primarily concentrated in the higher molecular weight asphaltene fractions, impart polar characteristic properties to the asphaltene molecules. It has been identified that these trace elements that are concentrated in this fraction are up to ten times higher than the corresponding crude oil.

Macromolecular Structure of Asphaltene

2. Organic Nitrogen Chemistry

Crude oil contains organic, N-containing compounds, however, the levels of organic N compounds in crude oil is considerably low (0.1-2 wt %). Organic N in petroleum is dominated by pyrrolic and pyridinic functional groups in aromatic heterocyclic compounds in petroleum crude. They are predominantly composed of non-basic pyrrolic and basic pyridinic heterocycles with a dominance of the pyrrolic over pyridinic types. Among various different classes of organic N compounds, the alkyl substituted carbazoles are known to be the predominant class of organic N compounds occurring in crude oils. Carbazoles and benzocarbazoles are also the common constituents of rock extracts and crude oils.

The concentration of the various types of N containing compounds varies in the oils between recovery stages. Generally, the crude oils from the latter recovery stage in each well show a reduced amount of the basic type of N containing compounds. As a whole, the amine fractions in the crude oils from the later recovery phase also demonstrate a decreasing trend. Conversely, the relative presence of neutral N containing compounds indicates an increasing trend. Thus, the N content and types in oil varies significantly, with most parts concentrated in the heavy fractions and residues.

The strong interaction between these compounds and reservoir minerals could be responsible for the reduced abundance of basic organic N compounds, as well as amine during oil recovery. Pyridinic-type functional group is believed to be a polar species involved in polar interaction between crude oil and mineral surfaces. The presence of residual refractory N compounds after hydrotreatment precludes them from their use in efficient upgrading of some of the feedstocks (e.g., middle distillates to transportation fuels).

Figure 2:
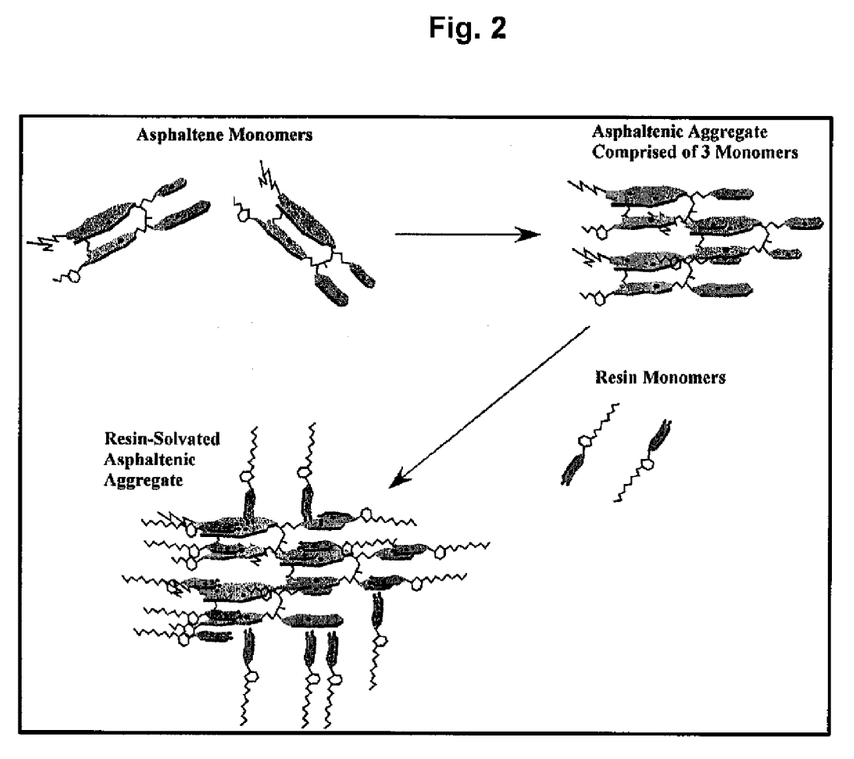
FIG. 2 is schematic diagram of asphaltene macromolecules, asphaltenic aggregates in the absence of resins, and asphaltenic aggregates in the presence of resins.

The resin fraction of crude oil is comprised of polar molecules often containing heteroatoms such as N, O, and S. This fraction is operationally defined, and one common definition of resins is as the fraction is soluble in light alkanes, such as pentane and heptane, but insoluble in liquid propane. Naphthenic acids are a part of this fraction. Resins are the most polar and aromatic species present in deasphalted oil (without asphaltene) and contribute to the enhanced solubility of asphaltenes in crude oil by solvating the polar and aromatic portions of the asphaltenic molecules and aggregates. The solubility of asphaltenes in crude oil is mediated largely by resin solvation, and thus resins play a critical role in precipitation and emulsion stabilization. Resins, although quite surface-active, have not been found to stabilize significantly water-in-oil emulsions by themselves in model systems. However, the presence of (optimal acidic-to-basic functional group ratio) resins in solution can destabilize emulsions (without asphaltene precipitation) via asphaltene solvation or replacement at the oil/water interface. The asphaltene aggregates in the presence or absence of resins are shown in FIG. 2.

Figure 3:
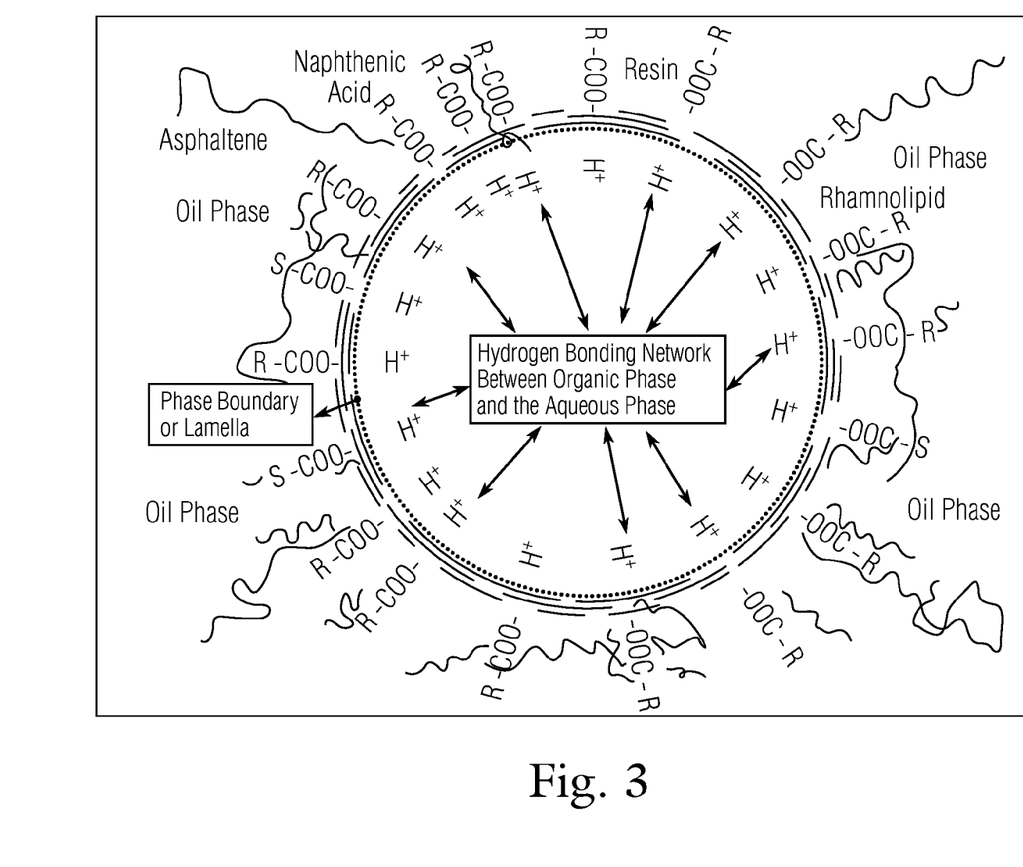
FIG. 3 is a representative diagram of an emulsion droplet interface.

Most acids are contained in the light and intermediate fractions, whereas asphaltenes and resins are essentially present in the heavy fraction. The contribution of the amphiphiles present in an acidic crude oil on the formation and stabilization of emulsions (depending upon the water content and initial pH of the aqueous phase) has been identified as follows: (I) the light naphthenic acids (low molecular weight) and naphthenates are unable to form and stabilize emulsions; (ii) the acids contained in the intermediate fraction (medium to high molecular weight) seem to dictate the type of emulsions formed with the crude oil; (iii) the naphthenates generated from the intermediate fraction are responsible for the formation and stabilization of o/w emulsions formed at high pH and water content; and (iv) the heaviest amphiphiles contained in the crude oil (i.e., resins and asphaltenes) play a major role in the long term stability of the oil-continuous emulsions. A schematic of representative emulsion droplet interface is shown in FIG. 3.

C. Demulsification and Extraction of Rhamnolipid (Biochemicals) from a Crude Fractions Feedstock One important challenge in demulsification of crude oil is the prevention of asphaltene precipitation from crude oil. The heaviest crude oil is extremely viscous with low API gravity, and low resin-to-asphaltene ratio with in some cases may have higher acid-to-base functional group ratio (or vice versa). In many cases, the resin-to-asphaltene ratio is below a critical threshold value, which leads to asphaltene precipitation once the emulsion is broken or destabilized. The high acidic to basic functional group ratio >4 or low acidic to basic functional group ratio <0.25 also leads to difficulty in demulsification. If the resin concentration is below or above the critical threshold value, the asphaltene molecules start aggregating and eventually precipitate out from the crude oil as there may not be enough solvating agents available for asphaltene dispersion. This is a great challenge for oil producers and processes which utilize crude and crude fractions for surface active product(s) formation. As discussed herein, the present invention overcomes this concern.

The resins are the solvating agents for the asphaltene macromolecules. Therefore, in cases where the resin-to-asphaltene ratio is below a critical threshold value additional resinous material (with balanced acidic-to-basic functional group ratio) is required to be added in the crude before or during the demulsification process. To balance this, resin solvents containing organic basic N group is added to bring the functional groups within the following range: 0.25<acidic to basic functional group ratio <4. These balanced, acidic-to-basic functional group ratio-containing additives are found in crude oil fractions or other natural sources. Usually, Coker gas oil or visbroken oil at different boiling point ranges with predominantly higher concentration of amine groups can be used as the additives in these heavy crudes as solvating agents for the asphaltene in the crude oil, however also to balance the acid to basic functional group ratio. However, if the crude oil contains very low acid-to-basic functional groups, resinous additives with increased acidic groups can be mixed to balance the acid to basic functional groups ratios would be required before breaking of the emulsion is initiated.

One of the critical steps in demulsification involves the coalescence of two emulsified droplets. To realize direct contact between water droplets and subsequent coalescence of the droplets to allow froth dewatering, the adsorbed material responsible for emulsion stability must be weakened, displaced, and deactivated from the crude oil—water interface to allow close contact between the droplets and reduction in viscosity at the interface. Such displacement or deactivation of the surface active agents can also be noticed from a change in the rheology at the interface. The complex rheology of crude oil—water interfaces is evident through the formation of rigid (or elastic) interfacial skins due to the presence of surface active agents (asphaltene, resin, or naphthenic acid) on the skin surface. The rigidity also depends on the aromatic resins-to-asphaltene ratio as well as the unbalanced acidic-to-basic functional group ratios in oil. It should be mentioned that this aromatic resins-to-asphaltene ratio is critical to keep the asphaltenes in segregated state and prevent any aggregation of the asphaltenes to precipitate out. The balanced acidic-to-basic functional group ratio in oil within the range of about 0.25 to 4 weakens the emulsion skin by controlling the zeta potential (−10 to 10 eV) or weakens the electrokinetic behavior at the skin.

The crude oil is a complex system composed of several different species, where the observed surface rheology will depend not only on relative surface activities but also on the ability of these components to partition between the bulk phases and the interface at various pH conditions. Specifically, asphaltenes adsorb at pure oil-water interfaces by creating elastic skins, and may undergo a reorientation and turn the surface layers rigid since the asphaltene molecules are bulkiest in size among all the crude components. While the addition of surface active compounds alters the elasticity of the interface, the mixed indigenous surfactant/asphaltene adsorbed layer creates very stable interfaces depending on the pH. However, the surface rheology may well be different if surface-active species natural to crude oils were present in the oil solutions are allowed to increase or decrease in addition to pH management. Further, the addition of demulsifiers to model systems containing surface-active crude oil components indicates that branch-chain chemicals could effectively displace the natural surface-active components.

Carbon dioxide has two undissociated forms in water with respect to increasing pressure: aqueous carbon dioxide and carbonic acid. Since the reaction of aqueous carbon dioxide to carbonic acid is slow, while carbonic acid dissociates rapidly at ambient conditions, carbonic acid is probably at a much lower concentration than aqueous carbon dioxide.

The pressurized carbon dioxide from subcritical range to supercritical range can dissolve additional carbon dioxide in the aqueous phase to form dissociated carbonic acid. The carbon dioxide dissolves more at higher pressure and consequently dissociates into $H^+$ ions. A temperature increase also enhances the dissociation of the carbonic acid.

In this invention, it is necessary to define the reversible/switchable/tunable proton [$H^+$] pump smart demulsifying agent. This demulsifying agent is formed in combination with $CO_2$, water, and, in some cases, with asphaltene solvating agents. High pressure $CO_2$ is introduced to a pressure vessel that can reach as high as 300 bar (i.e., above the supercritical pressure of $CO_2$). The temperature of the system is maintained below about 150° C. Several equations are necessary to describe the properties of the demulsifying agent, in our case carbonic acid dissolved into water phase.

Here, the gaseous $CO_2$ is occasionally denoted by $CO_2$ (g) with a partial pressure $p_{CO2}$. Dissolved $CO_2$ is denoted by $CO_2$ (aq), and dissolved carbonic acid is denoted by $H_2CO_3$, with [$H_2CO_3$*(aq)]=[$H_2CO_3$ (aq)]+[$CO_2$ (aq)]. $CO_2$ (g) is in equilibrium with $H_2CO_3$*(aq) with respect to pressure as shown in the following:

For simplicity, the sum of the molal concentrations of the dissolved $CO_2$ (aq) and carbonic acid, $H_2CO_3$(aq), is denoted by [$H_2CO_3$*(aq)]. In fact, 99.85% is $CO_2$ (aq) and only 0.15% $H_2CO_3$(aq). It is assumed that [$H_2CO_3$*(aq)] ≈$CO_2$ (aq) $CO_2$ (aq)+$H_2CO3$ (aq). Further, $CO_2$ gases in the gas space will be in equilibrium with the $CO_2$ in the aqueous phase according to Henry's law [$CO_2$ (aq)=$pCO_2$/kH], where, kH (mole kg-1 atm-1) is Henry's law constant. Therefore the solubility of $CO_2$ in aqueous phase would increase with respect to increasing pressure. Moreover, the solubility of $CO_2$ in water increases with respect to the decreasing temperature of the system. However, in order to maintain the supercritical behavior of $CO_2$ in the system, the temperature of the system has to be above the critical temperature of carbon dioxide in addition to the supercritical pressure of $CO_2$. As a result, the combined effect of carbon dioxide and water at higher pressures assumes unique properties inside a closed vessel or contactor. It is critical to maintain supercritical condition for $CO_2$ since at this condition the $CO_2$ readily diffuses into oil phase and readily reaches the o/w or w/o interface. The CO2 at the interface could establish equilibrium with the aqueous phase by forming $HCO_3^-$ and $H^+$. $CO_2$ at high pressure dissociates more readily thus significantly lowers the pH across the aqueous phase. As a result, the surface active components present at the interface would reach the isoelectric condition ($pH_{IEP}$) or zeta potential leading to deactivation of the surface active compounds.

The first dissociation constant of carbonic acid is given by the following: $K_1=\{a(H^+)a(HCO_3^-)\}/a(H_2CO_3^*)$, where, $a(j)$ is the activity of involved species j. Using the definition of pH and $pK_1$, this equation can be rearranged to the following: $pK_1=pH+\log\{[H_2CO_3^*]/[HCO_3^-]\}-\log(\gamma_a)$, where $j_a$ and $\gamma_a$ are the molal concentration and the activity coefficient of $HCO_3^-$ respectively. Here, the activity coefficient of the neutral species is assumed to be unity. Therefore, during the demulsifying process, $CO_2$ plays a dual role. The supercritical $CO_2$ diffuse through the crude phase (for w/o case) or water phase (o/w phase) due to better diffusivity and zero surface tension, and lowers viscosity to initiate mass transfer of the target compounds.

As mentioned earlier, the surface active components of crude oil (asphaltene, resins, naphthenic acid, fatty acid etc.) are all, to some extent, responsible for the formation of a stable emulsion. Therefore, the deactivation of the surface active components and weakening the viscosity or interfacial tension needs to be accomplished through various means. These include the presence or infiltration of subcritical to supercritical $CO_2$ at the interface, the reduction in the zeta potential at the interface or changing the HLD, and the introduction of lower molecular weight resin or resin-type compounds to solvate the asphaltene macromolecules.

Figure 4:
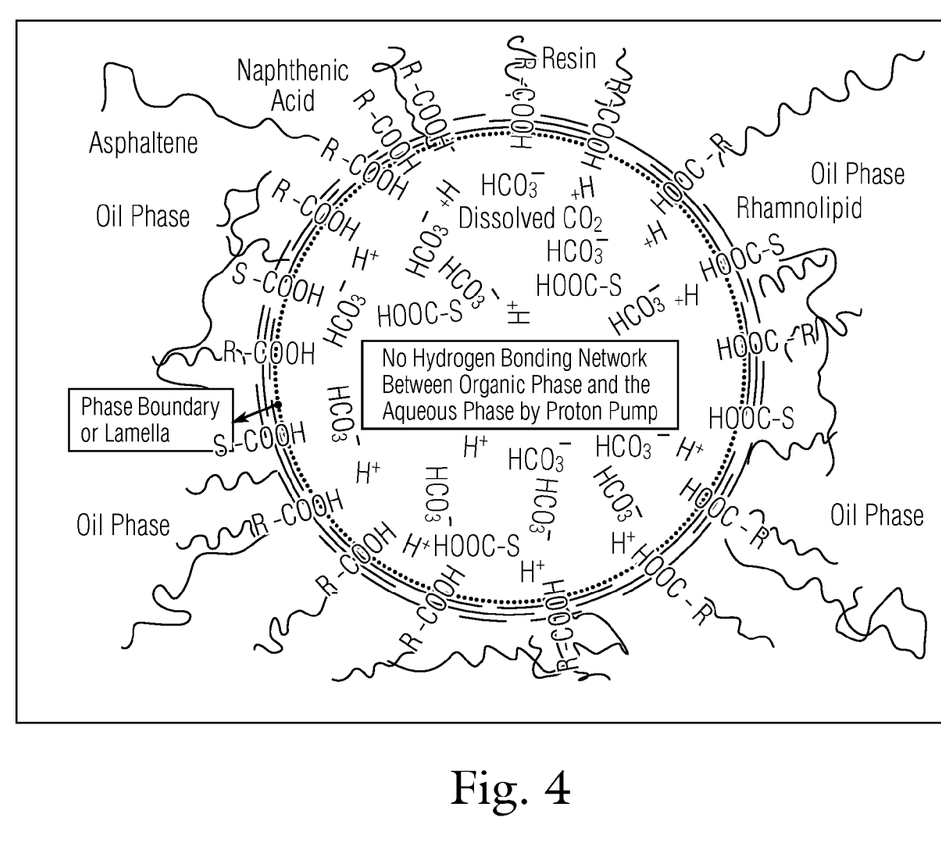
FIG. 4 is representative diagram of an entrapped rhamnolipid in an emulsion droplet.

The solvation by the resin-type additives weakens the surface viscosity and allows for the asphaltenes to freely reorient themselves such that the asphaltene molecules do not stack over each other (i.e., do not start forming aggregates and do not precipitate out. However, the salvation allows for the zwitterions of the asphaltenes to bridge not only with each other but also with the resin molecules with their oppositely charged polar attractions to form micelles without the presence of water molecules. The schematic of representative weakening of emulsion droplet interface and the entrapment of rhamnolipid molecules is shown in FIG. 4.

Although, the collapse of the films (film thickness) can be achieved at low pH and even at higher ionic strength salt in the aqueous phase by deactivating the surface active components of crude oil components, the prevention of asphaltene precipitation is of utmost importance. This is done by increasing the aromatic resin-to-asphaltene ratio (and/or balancing the acidic-to-basic functional group ratio) by the addition of aromatic solvents (e.g., Coker gas oil, Visbroken oil) which are readily available in a refinery. The quantities of the additives required depend on the type of crude oil or crude oil fractions.

Figure 1:
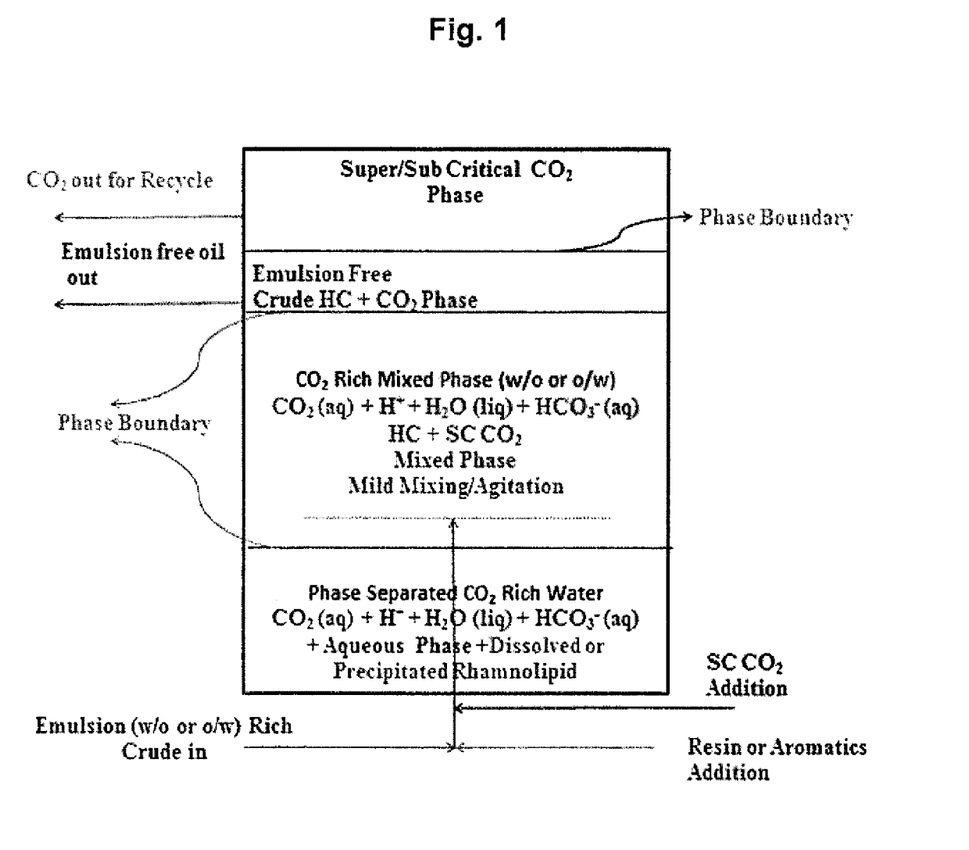
FIG. 1 is a diagram outlining the rhamnolipid extraction process from the crude oil emulsion.

A diagram outlining the biochemical (rhamnolipid) extraction process from the crude oil emulsion in accordance with the present invention is shown in FIG. 1.

In the current invention, the unique properties of subcritical and supercritical carbon dioxide are exploited by introducing it in the o/w or w/o, or w/o/w and o/w/o emulsion such that it not only diffuses into the oil-water phase boundary, but also reaches the aqueous phase (introduced externally or naturally present) to induce a large pH change (drop), and form carbonic acid by interacting with the water molecules around the emulsion film boundary.

Rhamnolipids are highly surface active compounds. They carry a sugar group (rhamnose) as well as fatty acid in its structure. They also have a carboxylic acid group associated with it. The chemical structure of a rhamnolipid is shown below:

mono-rhamnolipid
Rha-$C_{10}$—$C_{n+4}$

Therefore, for the extraction of rhamnolipids, the final pressure of the system must be controlled (subcritical to supercritical ranges) so that it creates a wide array of lower pH environments that interactively deactivates the acidic properties of the carboxylic groups of the indigenous surface active molecules—including rhamnolipids—at the o/w or w/o interface. With this deactivation, the interaction between the acid groups present in oil molecules and hydrogen bonds of water are deactivated or diminished when the pH of the aqueous phase drops well below the $pK_a$ (acid dissociation constant) value of various carboxylic acid groups of the oil components. Thus, the interaction between dissociated carboxylic acid groups (—$COO^-$) from the oil phase and water molecules are reverted by associating the organic acid groups (—$COO^-$) with its counter ion ($H^+$) and consequent disengagement of polar acidic group of oil phase and hydrogen bonding in water phase at the emulsion skin interface.

The diffusion of carbon dioxide at the interface of the emulsion reduces the viscosity and density, thereby lower the interfacial tension at the emulsion skin. By allowing sufficient relaxation time, this diffusion helps to rupture the emulsion by various means including coalescence. In this invention, the carbon dioxide diffused inside the water or at the oil/water (o/w) or water/oil (w/o) interface, and continuously migrates into the aqueous phase until equilibrium is established, as carbonic acid ($H_2CO_3$) and dissolved $CO_2$ builds up in the aqueous phase. Part of the carbon dioxide from the oil interface also establishes equilibriums with the water, as bicarbonate ($HCO_3^-$) ions are formed. Moreover, carbon dioxide present at the film interface has minimal electrical interaction with the oil phase, and as a result it creates negative synergy to the o/w or w/o emulsion skin (by viscosity reduction) and makes the skin elasticity weaker. If adequate time and temperature (25-150° C.) is allowed during the presence of subcritical and supercritical $CO_2$, the relaxation of organic polar groups in oil takes place at the interface of the emulsion and the film tenacity diminishes significantly.

The lowering of the pH in the aqueous phase in the system causes the resin acids and naphthenic acids to "switch off" their acidic properties, i.e., protons from these acids move back and associate back with the bicarbonate (—$COO^-$) anions into its undissociated state (—$COOH$) since they have higher $pK_a$ value than the pH at the emulsion interface due to the release of ($H^+$) from carbonic acid ($H_2CO_3$). This event takes place for the —$COOH$ groups from all of the larger nonpolar (organic) components of the naphthenic acids, resin acids, protoporphyrin, and asphaltene, which become inactive at lower pH due to the formation of carbonic acid and its dissociation to release proton ($H^+$) at elevated pressure.

Prior to $CO_2$ injection, the carboxylic acid (R—COOH) components of asphaltene, naphthenic acid, and resin present in the emulsion films are a primary reason for the strong interfacial tension of the films, giving them firmness, strength or tenacity. However, other polar components, viz., organic S, N, NH groups may shift their interaction with water at this lower pH conditions. It should be pointed out that the formation of H$^+$ ions from the dissociation of R—COOH at the oil-water contact region results in the formation of the emulsion interface. At this interface, the organic components of surface active components are pulled by the organic macromolecules of the oil phase by van der Waals attraction (or π-π attraction) in the direction of the oil phase. On the other hand, the dissociated H$^+$ ions from the surface active components (e.g., R—COOH) are pulled towards the water molecules by electrical attraction (or columbic pull) towards aqueous phase. This tussle at the w/o or o/w interface with the surface active components at the middle provides the basis for the development of interfacial film.

The strength of the film also results from the stack wise deposition of asphaltene molecules at the interface when polar asphaltenes also race towards the aqueous phase. The carboxylic and other polar groups of asphaltene may also take part in such interaction between the two phases. When the resins are the participating surface active agents, their aromatic counterpart is pulled by the aromatic core of the asphaltenes in the oil phase by π-π attractions. In the case of naphthenic acid, the organic counterpart (organic compound) is attracted by the van der Waals attraction by the aliphatic components of asphaltene and other organic components present in oil. For asphaltenes acting as the surface active agents at the interface, the emulsion becomes rigid and tighter. Here, the aromatic part of the asphaltenes are pulled by other asphaltenes in oil phase by π-π attractions and the aliphatic components of asphaltenes are pulled by the aliphatic components of resins and asphaltenes present or juxtaposed in the oil phase. In reality, it is the relative concentration of oil components, their temperature, size, transport properties, and polar groups that determine the type of oil components that end up at the interfacial skin.

The polar hetero atoms components of asphaltene macromolecules, (e.g., S, N, O, metals) also contribute to the strength of the emulsion films. These heteroatoms remain similar to zwitterions predominantly in asphaltene, and to some extent in resins. When subcritical to supercritical $CO_2$ is introduced to the crude oil containing o/w or w/o emulsion the intrusion of $CO_2$ has significant implication at the interface of the emulsions. The high pressure $CO_2$ induces pH drop and it is determined primarily by the applied pressure in the system. It is recognized that any weak acid present at this emulsion skin interface is slowly start going back to its undissociated form resulting in the weakening of the emulsion skin. Moreover, with weakening of the emulsion skin, the heteroatom-containing asphaltenes would get the opportunity to undergo inter and or intra-repositioning of the molecules or segments of the macromolecules due to the relaxation of the emulsion skin as such that the deactivated carboxylic groups (—COOH) would move inside the interior of the oil phase since it already lost its ability to interact with the aqueous phase in terms of hydrogen bonding capacity. This repositioning and reorganization of the macromolecules (asphaltene) may also take place between the oppositely electropositive and electronegative heteroatoms (zwitterions) within or between the macromolecules of asphaltenes, resin, and naphthenic acids. There can be many zwitterions (oppositely charged polar groups) in asphaltene and resin molecules.

Therefore, the changes in the electrokinetic behavior of these aggregates-water interactions at the emulsion skins are controlled by the local pH, formed from the dissociation of carbonic acid ($H_2CO_3$) (i.e., formation of H$^+$ and bicarbonate ($HCO_3^-$) ions) at the interface between oil and water such that the molecules comprising of organic acid (carboxylic) groups in oil components that are responsible for creating the strong emulsions go back to undissociated form by interacting with the proton (H$^+$) or hydronium ion ($H_3O^+$). Therefore, the carbonic acid acts as a proton pump at the interface to render the carboxylic acid (—COOH) groups inactive and thereby causing a change in the zeta potential (about −10 to 10 eV) at the interface such that the isoelectric point (IEP) of the resins and asphaltenes is reached at the films interface. This happens as the pH of the aqueous phase of the emulsion drops below the acid dissociation constant of the organic acids (carboxylic acid of naphthenic, resin, and asphaltenes) at the interface of the film.

As a result of this, the shift in the hydrophilic lipophilic (HLB) balance or hydrophilic lipophilic difference (HLD) at the film interface is such that the interfacial tensions of the emulsion films are rendered weaker. These phenomena take place as the zwitterions in the asphaltenes also start to interact within and between them. The carboxylic acid groups —COO− associate back with its counter ion H$^+$, resulting in the relaxation at the film surface (present in water) to form charge free —COON of resin and naphthenic acids along with the acid group of the asphaltene molecules. These effects result in the fading of the interaction between water and polar groups in oil phase.

When this is achieved, mild mixing of the emulsion system induces coalescence of the emulsions and consequently the size of the emulsions increase. The rupture of the interfacial films during the coalescence helps the emulsion droplets to assume a larger size. As the droplets reach the critical size, gravity will help separate the oil and water fractions as the coalescence continues. However, the pressure of the carbon dioxide and the system must be regulated such that asphaltene aggregation is controlled to avoid abrupt asphaltene precipitation from the oil phase.

Thus, the pressurized subcritical and supercritical carbon dioxide acts as both a proton pump and viscosity reducer during the demulsification process. This is carried out with or without the addition of solvating agents, (e.g., resins to prevent asphaltene precipitation). The higher aromatic resin-to-asphaltene ratio is critical for preventing asphaltene precipitation during emulsion breakup. Also, the acidic-to-basic functional group ratio in the crude oil is important for emulsion destabilization. Therefore, the addition of aromatic resin type material (e.g., Coker gas oil, visbreaker oil, or phenyl-containing molecules from bio sources) aids in the thinning of the interfacial skin, keeps the asphaltene macromolecule in solvated form and lowers its rigidity to allow for coalesce of the emulsion droplets into larger one by adjusting it within the range of about 0.25<acidic to basic functional group ratio <4.

The carboxylic group in rhamnolipid ($pK_a$~4.28-5.56) molecules with falling pH in the aqueous phase also goes back into undissociated form. As a result, the rhamnolipids loses part of its surface active character/power. However, the —OH groups present in the sugar moieties of rhamnolipids can help dissolve the molecules in the aqueous phase depending on the temperature of the system. Lowering the temperature of the system can aid in the precipitation of rhamnolipid in the aqueous phase. This initiates phase separation of rhamnolipid into the aqueous phase and it must be accomplished while maintaining high pressure (with $CO_2$ present) of the system due to the higher hydrophilic contribution from the sugar moieties in the rhamnolipids molecules. In this situation, simultaneous emulsion coalescence also induces larger droplet formation resulting in the gravity separation of the water and oil phase. The precipitated or dissolved rhamnolipids collected in the aqueous phase are then extracted by temperature swing or evaporation of the water.

Specific features of the present invention are described below:

In this invention, the demulsifying agent (proton pump) is formed by the pressurized subcritical and supercritical carbon dioxide in combination with water and, in some cases, asphaltene solvating agents. Specifically, the high pressure $CO_2$ is introduced to a pressure vessel where could reach as high as 300 bar (i.e., above the supercritical pressure of $CO_2$). The temperature of the system is maintained below approximately 150° C.

The final pressure of the system need to be controlled (subcritical to supercritical ranges) such that it creates a wide array of lower pH environments that interactively deactivates the acidic properties of the carboxylic groups of the asphaltenes, resin acids, naphthenic acid groups at the o/w or w/o interface. With this deactivation, the interaction between the acid groups and other polar groups present in oil molecules and hydrogen bonds of water are deactivated or diminished when the pH of the aqueous phase drops below the $pK_a$ (acid dissociation constant) value of the carboxylic acid groups of the oil components. Thus, the interaction between dissociated carboxylic acid groups (—COO—) from the oil phase and water molecules are reverted by associating the organic acid groups (—COO—) with its counter ion ($H^+$) and consequent disengagement of polar acidic group of oil phase and hydrogen bonding in water phase at the emulsion skin interface. At high pressure (70-200 atm) and about 25-70° C., the pH is between approximately 2.8 and 2.95. Therefore, the pH near or at the supercritical range (71 atm and 32° C.) of water in the emulsion is around ~3.00, which is enough to deactivate the indigenous organic acid of the crude oil in undissociated form.

Emulsions from crude oil with a higher acid-to-basic functional group ratio are generally difficult to break, while crude oil with lower acid-to-basic functional group ratio (0.25-<4) ratio is comparatively easier to break. Thus, the ratio of acid-to-basic functional groups (e.g., organic N, sulofoxide) in asphaltenes and resins are of prime importance for emulsion stability. The acid-to-basic functional group ratio should be balanced such that it should be between a certain range (~0.25<Acidic to Basic functional group ratio <~4) to neutralize the oppositely charge polar functional groups. The addition of resinous compounds containing basic or acid functional groups should be added to adjust the acidic-to-basic functional groups so that the overall ratio stays within the above range to destabilize the emulsions.

Some of the basic crude oil which contains pyrrole and pyridine groups in their resin and asphaltene structures can also participate in forming emulsions (w/o or o/w). Both pyrrole and pyridine groups have lone pair electrons. When they are in water, they have a tendency to bind with $H^+$ ions from water leaving the $OH^-$ ions of water lurking in the water phase. As a result, the organic nitrogen containing groups also create film on the oil water interface. The strength of the film depends on two parameters. The first parameter being the basicity of the organic nitrogen and the second one is the size the associated organic counterpart of these groups in the oil phase. It is important to understand that the lone pair electrons are very receptive towards accepting protons. The columbic pull between the proton attached organic nitrogen containing (pyrrole and pyridines) groups and the $OH^-$ present in the aqueous phase causes increased concentration of amphiphiles from the oil phase to gather at the interface between oil and water resulting in the formation of interfacial skins.

At this point, due to comparatively smaller size of the resin molecules, they tend to rush faster to the interface (o/w or w/o). However, depending on the resin to asphaltene ratio (low), some asphaltene may also end up and stack up at the interface. Here, the functional groups, like —COOH and organic nitrogen, interact with the water molecules and their hydrophobic amphipiles stay in the oil phase. In all cases, some of the asphaltene molecules and in some cases wax particles also stack up over the resin and asphaltenes, and thus tightens the emulsion skin interface.

When high pressure $CO_2$ is introduce or charged in such emulsions, the carbonic acid ($H_2CO_3$) gets dissociated in the aqueous phase in $HCO_3^-$ and the H+ ions get attached with the lone pair electrons of the organic nitrogen groups. When this happens, the organic N containing groups gradually lose their basic properties. Additionally, the counter $OH^-$ ion dissociated from water gets neutralized or solvated by the dissociated $H^+$ ions from the associated $OH^-$ ions. With the presence of increased concentration of $H^+$ ions from carbonic acid, the pH of the system drops and the emulsion interface becomes weaker and the concentration of $OH^-$ ion concentration reduces. With the diminishing $OH^-$ ion concentration and increasing $H^+$ ion concentration from the carbonic acid ($HCO_3^-/H_2CO_3$), the pH in the aqueous phase drops inside the emulsion and thus there is a weakening of the emulsion interface. With mild agitation, the weakened emulsions are easy to coalesce. Once this process is continued, the droplets gets larger in size and eventually phase separation take place due to the action of gravitational force start having an effect on the larger droplets. However, in order to avoid asphaltene precipitation, the aromatic resin-to-asphaltene ratio is maintained at a prescribed value or range by adding aromatic resinous material to keep the larger asphaltene macromolecules solvated and prevent them from stacking over each other.

EXAMPLES

The following examples are provided to better illustrate embodiments of the present invention, but they should not be construed as limiting the scope of the present invention.

Example 1 w/o Emulsion

In this example, the temperature of the crude oil can range from below 0° C. (the freezing point of water) to a maximum of approximately 250° C. The pressure of the system can range from about 1 bar to about 300 bar. The optimal temperature of the system could be above the subcritical-supercritical temperature of carbon dioxide to 0° C. to a maximum of 300° C. (to melt the wax particles from the skin interface). The tuning of pH of the aqueous phase is important for lowering the zeta potential (−10 to 10 eV) at the skin interface to reach near the isoelectric IEP of the resin and asphaltenes.

Emulsified (water-in-oil) crude oil is intimately mixed with subcritical to supercritical $CO_2$ in the oil reservoir or inside a demulsification vessel. The mixture is allowed to stabilize so that the subcritical to supercritical $CO_2$ or vice versa can diffuse across the oil phase to reach the emulsion phase boundary and eventually progress inside the aqueous phase. The pH inside the aqueous phase is dropped down due to the formation of carbonic acid and its subsequent dissociation of the acid to generate increased concentration of $H^+$ ions and moves below the acid dissociation constants of carboxylic acid components.

As a result, at the phase boundary, the zeta potential would fall within −10 to 10 eV or close to zero to make the interfacial film much weaker. As the pH drops due to the increased pressure of $CO_2$ partial pressure in the aqueous phase, and falls below the $pH_{IEP}$ and acid dissociation constants of the carboxylic acid groups of the resin, asphaltene and naphthenic acid molecules, they lose their dissociating power in the aqueous phase.

Consequently, as the carboxylic acid groups of the resin, asphaltene, and naphthenic acids are reverted back to undissociated state, the $H^+$ ion from these carboxylic acid groups cannot interact with the water molecules in the aqueous phase. In this situation, organic components of the carboxylic acids (which act as indigenous surface active agents) of the resin, asphaltenes, and naphthenic acids are pulled back towards the oil phase thereby weakening the interfacial tension. This causes the dropping of the zeta potential at the emulsion interface and the resulting electrical double layers (EDL) are weakened as well.

If the aromatic the resin to asphaltene ratio in the system is below the critical value, resin supplements from refinery products (e.g., Coker gas oil, Visbreaker oil) are introduced prior to the carbon dioxide injection to maintain the aromatic resin-to-asphaltene ratio higher than the critical value and thus avoid asphaltene precipitation. Molecules analogous to resin molecules derived from bioresources (e.g., liquefied lignin components such as vanillin, lignin sulfonates etc.) or petroleum fractions can be introduced as alternatives to resin prior to the carbon dioxide injection to maintain the aromatic resin to asphaltene ratio to prevent asphaltene precipitation.

Also, for efficient emulsion breaking, the aromatic basic resins may have to be added to bring the overall acidic to basic function group ratio between 0.25-4 when there is higher concentration of —COOH groups in the crude oil while the optimum ratio should be between 0.5-2. If however, the crude oil is basic in nature, resin supplements with acidic functional groups are required to maintain the acid to basic functional group ratios. At a low pH in the aqueous phase, rhamnolipids molecules (biochemical) precipitate or transfer to the aqueous phase depending on the system temperature. Rhamnolipids are then extracted from the aqueous phase via evaporation of water from the aqueous phase or by some other recovery technique.

Example 2 w/o Emulsion

Example 2 includes the same steps and same operating conditions as in Example 1 with the difference being that instead of an oil-in-water emulsion being used (as in FIG. 1), a water-in-oil emulsion is used in FIG. 2. The rhamnolipids molecules (biochemical) precipitate or transfer to the aqueous phase depending on the system temperature. Rhamnolipids are then extracted from the aqueous phase via evaporation of water from the aqueous phase or by some other recovery technique.

While the present invention has been described above using several specific examples and embodiments, there are modifications and variations that will be apparent to those having ordinary skill in the art. As such, the described embodiments are to be considered in all respects as illustrative, and not restrictive. Therefore, the scope of the invention is indicated by the appended claims, rather than by the foregoing description. All changes that come within the meaning and range of equivalency of the claims are to be embraced within their scope.

What is claim is:

1. A process for demulsification and extraction of biochemicals from crude oil and its fractions without precipitating other surface active molecules that are part of the crude oil comprising the steps of:
   mixing a crude oil emulsion with carbon dioxide from subcritical range to supercritical range to form a mixture, the emulsion containing surface active molecules including aromatic resins, asphaltenes and the biochemicals;
   maintaining the mixture at conditions that cause the pH of an aqueous phase of the emulsion to decrease to a first pH value which causes weakening of an interfacial tension of the emulsion; and
   maintaining an aromatic resin to asphaltene ratio to be greater than a predefined value such that the asphaltenes are suspended or solvated by the aromatic resins and asphaltene precipitation is prevented, while the biochemicals precipitate or transfer to the aqueous phase and the biochemicals are extracted from the aqueous phase.

2. The process of claim 1, wherein the crude oil emulsion comprises an emulsion selected from the group consisting of: an oil in water emulsion; a water in oil emulsion; water-in-oil-in-water emulsion; and oil-in-water-in-oil emulsion.

3. The process of claim 1, wherein the biochemicals comprise rhamnolipids.

4. The process of claim 1, wherein the surface active molecules comprise molecules having a carboxylic acid group.

5. The process of claim 4, wherein the surface active molecules include naphthenic acids.

6. The process of claim 4, wherein the first pH value is below a $pH_{IEP}$ and acid dissociation constants of the carboxylic acid groups of the aromatic resins and asphaltenes.

7. The process of claim 1, further including the step of allowing the mixture of the crude oil emulsion and the carbon dioxide to stabilize such that the carbon dioxide diffuses across an oil phase of the crude oil emulsion to an emulsion phase boundary and subsequently enters an aqueous phase of the crude oil emulsion.

8. The process of claim 1, further including the step of introducing a resin supplement from refinery products into the emulsion prior to addition of the carbon dioxide when the aromatic resin to asphaltene ratio is below the predefined value.

9. The process of claim 1, further including the step of introducing one of: (1) molecules that are derived from bioresources and (2) petroleum fractions prior to addition of the carbon dioxide to maintain the aromatic resin to asphaltene ratio greater than the predefined value.

10. The process of claim 1, further including the step of maintaining an overall acidic to basic function group ratio between 0.25 to 4.

11. The process of claim 10, wherein the ratio is maintained between 0.5 and 2.

12. The process of claim 10, further including the step of adding additional aromatic resins to maintain the overall acidic to basic function group ratio between 0.25 to 4.

13. The process of claim 1, where the crude oil emulsion is contained in a vessel and a temperature of the crude oil emulsion is above a freezing point of water; a pressure of vessel being maintained between 1 bar to 300 bars; and a temperature of the vessel is above the subcritical-supercritical temperature of carbon dioxide and below 150° C.

14. The process of claim 1, further including the step of adjusting the pH of the aqueous phase to cause a lowering of a zeta potential, at a phase boundary of the emulsion, to reach near an isoelectric point of the aromatic resin, naphthenic acid and the asphaltenes, thereby causing an interfacial film of the emulsion to weaken.

15. The process of claim 14, where the zeta potential is lowered to between −10 eV to 10 eV.

16. The process of claim 1, wherein the asphaltenes are kept solvated in the crude oil emulsion and thereby prevented from precipitating.

17. The process of claim 1, wherein —COOH groups of the surface active molecules become inactive at the first pH value due to formation of carbonic acid and dissociation thereof to release a proton ($H^+$) at elevated pressures within a vessel containing the mixture.

18. The process of claim 1, further including the step of maintaining an overall acidic to basic function group ratio between 0.25 to 4 and maintaining the pH of the aqueous phase below a $pK_a$ of the biochemicals, thereby causing the biochemicals to be electrically inactive and allowing precipitation or remain in dissolved form due to the hydrogen bonding with the aqueous phase thereof.

19. A process for demulsification and extraction of biochemicals from crude oil and its fractions comprising the steps of:

mixing a crude oil emulsion with carbon dioxide from subcritical range to supercritical range to form a mixture, the emulsion containing surface active molecules including aromatic resins, asphaltenes and the biochemicals;

maintaining the mixture at conditions that cause the pH of an aqueous phase of the emulsion to decrease to a first pH value which causes weakening of an interfacial tension of the emulsion, thereby causing demulsification to occur; and maintaining the mixture at conditions that cause the asphaltenes to remain solvated in the crude oil, thereby preventing asphaltene precipitation, while the biochemicals precipitate or transfer to the aqueous phase and the biochemicals are extracted from the aqueous phase.

* * * * *